Figure 1:
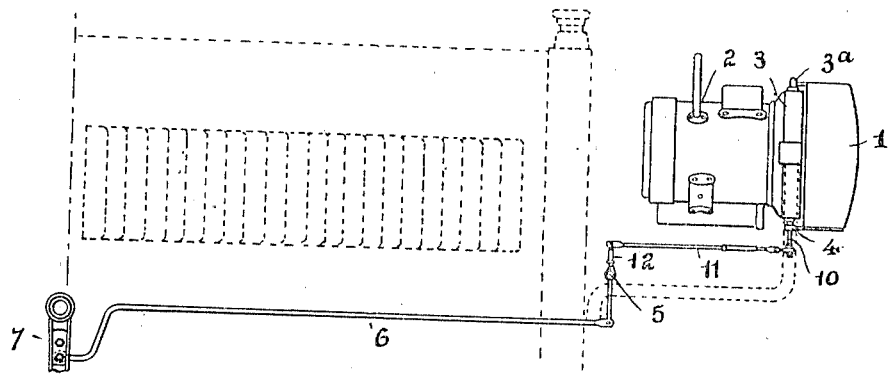

C. C. BRUFF.
HEADLIGHT.
APPLICATION FILED SEPT. 20, 1912.

1,063,952.

Patented June 10, 1913.
2 SHEETS—SHEET 1.

C. C. BRUFF.
HEADLIGHT.
APPLICATION FILED SEPT. 20, 1912.

1,063,952.

Patented June 10, 1913.

2 SHEETS—SHEET 2.

Witnesses:
L. H. Staaden.
Anna Hoyer.

Inventor:
Charles Clarke Bruff
by Alfred Clemen
atty.

UNITED STATES PATENT OFFICE.

CHARLES C. BRUFF, OF COALPORT, ENGLAND.

HEADLIGHT.

1,063,952.

Specification of Letters Patent.   Patented June 10, 1913.

Application filed September 20, 1912.   Serial No. 721,365.

*To all whom it may concern:*

Be it known that I, CHARLES CLARKE BRUFF, a subject of His Majesty the King of England, residing at Coalport House, Coalport, in the county of Shropshire, England, have invented certain new and useful Improvements in Headlights, of which the following is a specification.

This invention has relation to reflecting devices for use in diverting the path of light rays emitted from the head lamps or the like of automobiles or other vehicles, boats or the like which are provided with two or more of such lamps placed side by side; one of the chief uses of such invention will be in connection with automobiles in which application it will be hereinafter described. In such connection it aims to make better provision generally for the guidance of an automobile driver when piloting his vehicle through country roads on dark nights when it is ordinarily impossible or exceedingly difficult for him to locate the ditches or wayside obstructions such as large stones.

According to this invention when the vehicle is being turned the illumination is so varied that the driver is enabled to get a clear view both of the road in front of him and of the road in the direction in which he is turning; and the area so illuminated under normal conditions is practically continuous. For this purpose a reflector is movably located forwardly of each lens of the two headlights, such reflectors being simultaneously and automatically operable to be moved to deflect a portion of each beam of light to the side of the vehicle in accordance with the change in direction of the steering wheels. By this arrangement of the reflectors on the head lamps when the vehicle is turning to the right, for instance, the beam of light from the inner lamp will be split into two parts one being deflected to the right in accordance with the movement of the steering wheels, the other undeflected part being projected in the direction of the chassis. There is thus a patch between these two parts which is not illuminated by the inner lamp, but the beam emitted from the outer lamp is also correspondingly divided into two parts by the reflector with the result that the deflected part fills up the said patch not illuminated by the inner lamp, the undeflected part of the beam of the inner lamp also filling up the space between the deflected and undeflected parts of the outer lamp. By this invention therefore when the automobile or the like is turned to the right or left the continuous width of illumination is automatically spread, respectively to the left or right without any dark patches being formed between the deflected and undeflected parts of the beams, so that not only is the area illuminated directly ahead of the chassis as in the case of fixed head lamps ordinarily used but a corresponding area is similarly illuminated ahead of the steering wheels which latter have been rotated in relation to the chassis. Thus it will be seen that if the driver of the automobile has to suddenly change the direction of the vehicle for instance to the right, light is automatically projected in that direction, while light is at the same time projected forwardly of the chassis and therefore if he has to quickly reverse the automobile to the left he can do so with a maximum of safety.

The invention further consists in improved means for automatically operating the reflectors from the steering gear and for enabling the reflector to be detached from the lamp when such reflectors are not required to be used.

In order that the invention may be clearly understood and readily carried into practice reference may be had to the accompanying drawings on which:—

Figure 2:
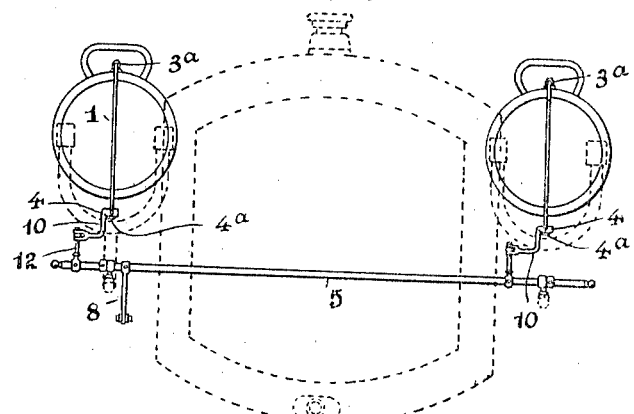
Figure 3:
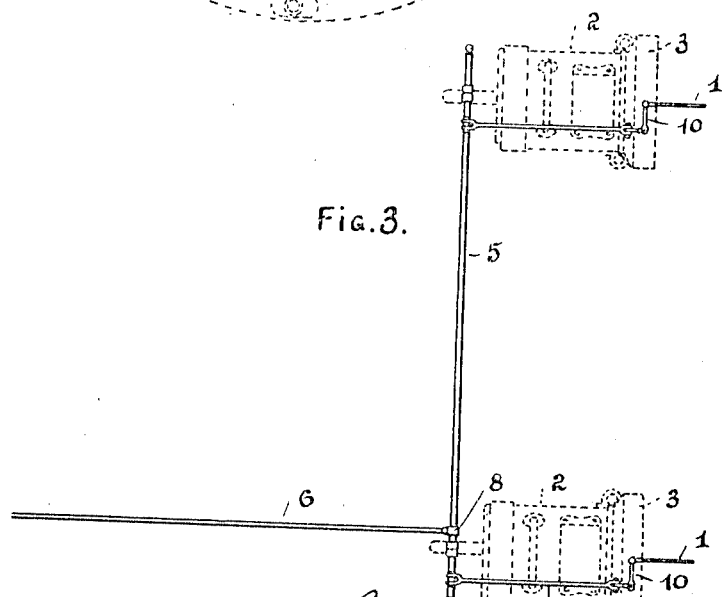
Figure 4:
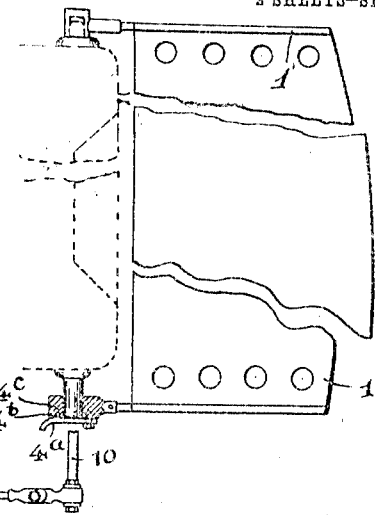
Figure 6:
Figure 7:
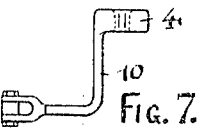
Figure 5:
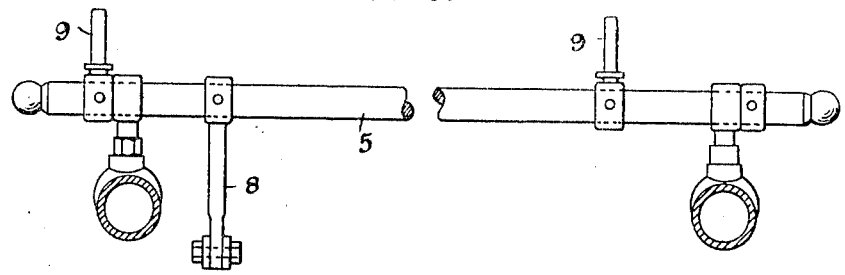

Figure 1 is a view of a head lamp of an automobile having fitted thereto a reflector which is operatively connected to the steering gear. Fig. 2 is a front view of a portion of Fig. 1. Fig. 3 is an underside plan view of a portion of Fig. 1. Fig. 4 is an enlarged side elevation of the reflector and the means operatively connecting it to a rocking shaft operated through the medium of the steering gear. Fig. 5 is an enlarged view of the rocking shaft. Figs. 6 and 7 are enlarged detail views.

According to a convenient embodiment, a vertical reflector 1 is attached to each lamp 2 so as to project forwardly thereof and so as to be capable of horizontal movement about a vertical axis, the reflector 1 normally, *i. e.*, when the car is running with all wheels parallel, being in a vertical plane parallel to the direction of the automobile and consequently the reflector offers little or no obstruction to the direct beam from the lamp in virtue of being presented edgewise thereto.

The lamps are stationarily attached to the chassis in any convenient manner and the reflectors are preferably detachably secured to the rim 3 of the lamps 2 as by pin receiving sockets 3ª and 4 projecting respectively from the upper and lower rear corners thereof, the bottom socket 4 being open at the top and bottom to admit of its being first engaged with a stud projecting from the rim, while the top socket 3ª is open at its lower end only. The bottom of the socket 4 has fitted thereto a pivotally mounted spring tongue 4ª which at its outer end is provided with a projection 4ᵇ to engage and lock in a recess 4ᶜ when such tongue 4ª is moved across the bottom of the socket 4 to prevent accidental detachment of the reflector, the closed end of the upper socket 3ª co-acting with the tongue 4ª to this end.

The rotary movements of the reflectors are effected simultaneously and automatically from the steering gear and according to the extent of the angular displacement of the reflector from the normal position so the illumination effects of the head light will be caused to vary in virtue of the reflection of the light rays incident on the reflector.

According to a convenient means of automatically rotating the reflectors from the steering gear, a rocking shaft 5 is fitted to the front of the automobile, which shaft is rocked by means of the lever 6 connected to the steering crank 7 and to the depending crank pin 8 secured to the rocking shaft. Also secured to the shaft 5 are crank pins 9 which are connected by the adjustable rod 11 to the L-shaped member 10 secured to the socket 4.

The connection of the adjustable rod 11 to the crank pin 9 is preferably effected by means of a tubular member 12 adapted to slide thereover and pivotally connected to the lever 11 whereby the reflector 1, member 10 and rod 11 and tubular member 12 may be detached and packed away as a unit ready for instant application when desired.

It will now be understood that in turning sharp corners, the reflectors move over with the wheels and by spreading the light produce a desirable illumination of the corners while still leaving the pilot illumination from the straight beam, there being a continuous area of illumination without dark patches. Correspondingly the road and objects to the right or to the left, as the case may be, are illuminated in a desirable manner when the vehicle is traveling along a bending road, or taking a turning.

A further advantage afforded by the invention is that the increase in the effective lateral range of the illumination of the beam on one side or the other of the limits of the normal range thereof acts as a light signal to indicate the direction in which the vehicle or the like is turning or is about to turn to both those approaching and those following the vehicle or the like. In the former connection the reflector covering up a portion of the lens to those approaching acts as an additional signal to give the direction of turning of the vehicle, and such signals would enable those approaching to be prepared for the impending change of direction of the vehicle or the like. Moreover the light deflected into a side road or around an abrupt bend such as a "hair pin" bend into or around which the vehicle is being steered will act to give indication of the approach thereof before the vehicle itself may be visible to those approaching.

Having now described my invention, what I claim is:—

1. In or in connection with the head lamps of automobiles or the like, vertical reflectors rotatably mounted in front of such lamps, and means for automatically and simultaneously rotating said reflectors in accordance with the turning of the vehicle, whereby the beam of light from each lamp is divided so that an area is illuminated which extends both directly in front of the vehicle and in the direction in which it is being turned.

2. In or in connection with the head lamps of automobiles or the like a rotatable vertical reflector detachably mounted forwardly of each lamp, a member secured in relation to the chassis of the vehicle and automatically operated for rotating the reflector in accordance with the change in direction of the vehicle, and connections detachably engaged with said member for transmitting motion to said reflector, which connections and reflector are detachable as a unit.

3. In or in connection with the head lamps of an automobile or the like, a rotatable vertical reflector detachably mounted forwardly of each lamp, a rocking shaft secured to the vehicle, means for rocking the shaft from the steering gear, and means connecting and transmitting motion from the rocking shaft to the reflector, which means are detachable from the rocking shaft.

In testimony whereof I affix my signature in presence of two witnesses.

CHARLES C. BRUFF.

Witnesses:
KATHLEEN M. THOMPSON,
JAMES DAVIES.